UNITED STATES PATENT OFFICE.

HAMILTON SANBORN, OF RHYOLITE, NEVADA, ASSIGNOR OF ONE-HALF TO SAM F. LINDSAY, OF RHYOLITE, NEVADA.

FUME-DESTROYING COMPOSITION.

No. 854,533.      Specification of Letters Patent.      Patented May 21, 1907.

Application filed May 24, 1906. Serial No. 318,559.

*To all whom it may concern:*

Be it known that I, HAMILTON SANBORN, a citizen of the United States, residing at Rhyolite, in the county of Nye and State of Nevada, have invented new and useful Improvements in a Fume-Destroying Composition, of which the following is a specification.

My invention relates to a composition for destroying obnoxious gases and fumes in mines.

The invention comprehends placing 50% of carbonate of ammonia, 25% of calcium chlorid, and 25% of bicarbonate of soda in a cartridge, and depositing the cartridge in the bottom of the blast hole prior to inserting and discharging the blast.

When the blast is exploded certain chemical reactions take place, the nature of which I am unfamiliar with; but I have found that the chemicals enumerated have the effect of rendering innocuous the gases contained in or generated by the explosion of nitro-glycerin powder; and that it purifies, clears up and cools the air in the mine so that the miners can return to work at once. It prevents any injurious effects and obviates headaches and sickness which so often follow the discharge of a mine blast.

The ingredients are preferably intimately mixed together in a dry pulverized form in quantities sufficient for the particular cartridge charge or size of the ingredients, being substantially in the proportion before given.

Having thus described my invention, what I claim and desire to secure by Letters Patent is—

1. A composition for fume destroying cartridges consisting of a mixture of carbonate of ammonia, calcium chlorid, and bicarbonate of soda wherein the proportion of the carbonate of ammonia is in excess of that of the calcium chlorid.

2. A composition for fume destroying cartridges consisting of a mixture of carbonate of ammonia, calcium chlorid, and bi-carbonate of soda, the proportion of carbonate of ammonia being in excess of that of either the calcium chlorid and bi-carbonate of soda.

3. A composition for fume destroying cartridges consisting of a mixture of carbonate of ammonia, calcium chlorid, and bi-carbonate of soda, the proportion of calcium chlorid being substantially one-half of that of the carbonate of ammonia.

4. A composition for fume destroying cartridges consisting of a mixture of carbonate of ammonia, calcium chlorid, and bi-carbonate of soda, the proportion of bicarbonate of soda being substantially one-half of that of the carbonate of ammonia and substantially equal to that of the calcium chlorid.

In testimony whereof I have hereunto set my hand in presence of two subscribing witnesses.

HAMILTON SANBORN.

Witnesses:
     JOHN BECKMAN,
     J. B. LINDSAY.